United States Patent
Chi et al.

(10) Patent No.: US 9,012,591 B2
(45) Date of Patent: Apr. 21, 2015

(54) COPOLYMERIZED POLYCARBONATE RESIN, METHOD FOR PREPARING THE SAME, AND ARTICLE COMPRISING THE SAME

(71) Applicant: Cheil Industries Inc., Gumi-si (KR)

(72) Inventors: Jun Ho Chi, Uiwang-si (KR); Jong Chan Hur, Uiwang-si (KR); O Sung Kwon, Uiwang-si (KR); Woo Suk Chei, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/108,689

(22) Filed: Dec. 17, 2013

(65) Prior Publication Data

US 2014/0187738 A1   Jul. 3, 2014

(30) Foreign Application Priority Data

Dec. 27, 2012   (KR) ........................ 10-2012-0155616

(51) Int. Cl.
| | |
|---|---|
| *C08G 64/00* | (2006.01) |
| *C08G 64/06* | (2006.01) |
| *C08G 64/30* | (2006.01) |
| *C08G 63/02* | (2006.01) |

(52) U.S. Cl.
CPC .............. *C08G 64/06* (2013.01); *C08G 64/307* (2013.01)

(58) Field of Classification Search
USPC ........................ 528/196, 198; 264/176.1, 219
See application file for complete search history.

(56) References Cited

U.S. PATENT DOCUMENTS

| | | | |
|---|---|---|---|
| 5,401,826 A | | 3/1995 | Sakashita et al. |
| 7,642,335 B2 * | | 1/2010 | Scindia et al. ................ 528/219 |

FOREIGN PATENT DOCUMENTS

| | | |
|---|---|---|
| JP | 05-339390 A | 12/1993 |

* cited by examiner

*Primary Examiner* — Terressa Boykin
(74) *Attorney, Agent, or Firm* — Additon, Higgins & Pendleton, P.A.

(57) ABSTRACT

A copolymerized polycarbonate resin includes a repeat unit represented by Formula 1; a repeat unit represented by Formula 2; and a repeat unit represented by Formula 3, wherein the repeat unit represented by Formula 1 is different than the repeat unit represented by Formula 3, and wherein Formula 1, 2, and 3 are the same as defined in the specification. The copolymerized polycarbonate resin can have excellent properties in terms of chemical resistance, thermal resistance, and/or external appearance.

14 Claims, No Drawings

COPOLYMERIZED POLYCARBONATE RESIN, METHOD FOR PREPARING THE SAME, AND ARTICLE COMPRISING THE SAME

CROSS-REFERENCE TO RELATED APPLICATION

This application claims priority under 35 USC Section 119 to and the benefit of Korean Patent Application No. 10-2012-0155616, filed Dec. 27, 2012, the entire disclosure of which is incorporated herein by reference.

FIELD OF THE INVENTION

The present invention relates to a copolymerized polycarbonate resin, a method for preparing the same, and an article including the same.

BACKGROUND OF THE INVENTION

Polycarbonate resins are representative thermoplastic materials having a thermal deformation temperature of about 135° C. or more. Polycarbonate resins exhibit excellent mechanical properties in terms of impact resistance, self extinguishability, dimensional stability, thermal resistance, and transparency. Thus, polycarbonate resins are widely used in the manufacture of exterior materials for electric/electronic products, office equipment, automobile components, and as optical films, and the like.

However, despite good transparency and mechanical properties, conventional polycarbonate resins have limitations as exterior materials. When a plastic material is used as an exterior material, the plastic material is generally painted to provide a pleasant appearance. In this case, paints are diluted in various organic solvents, followed by deposition and drying of the diluted paints on a surface of a resin article. In this process, the organic solvents used as diluents infiltrate into polycarbonate, thereby causing deterioration in transparency and mechanical strength. In addition, when polycarbonate resins are prepared by melt polymerization at high temperatures, fine gels can be produced by Fries rearrangement, and can create pin holes on the surfaces of thin articles such as films and the like, which are produced using the polycarbonate resins.

Thus, polycarbonate resins require chemical resistance in order to be used in articles exposed to various organic solvents and must prevent formation of fine gels at high temperature in order to be used in various applications such as optical films and the like.

As a method for improving chemical resistance, a polycarbonate resin can be blended with a resin having chemical resistance to suppress infiltration of an organic solvent. Although this method can slightly improve chemical resistance, there is a problem of deterioration in impact resistance. In this case, although an impact modifier can be used to improve the deteriorated impact resistance due to blending, there is a problem of significant deterioration in transparency of the resin. To improve chemical resistance, a method for preparing a copolymerized polycarbonate by adding a material having chemical resistance upon polymerization of the polycarbonate is disclosed in Japanese Patent Publication No. H5-339390A, U.S. Pat. No. 5,401,826, and the like. One example of a material having chemical resistance may include 4,4'-biphenol (BP), which may be copolymerized with bisphenol A to improve chemical resistance. However, even in the case of using a material having chemical resistance such as 4,4'-biphenol (BP), it is difficult to prevent or reduce formation of the fine gel due to high reaction temperature.

Therefore, there is a need for a polycarbonate resin that can prevent deterioration in external appearance due to fine gels and can exhibit excellent chemical resistance without deterioration of inherent properties, such as thermal resistance, transparency, and the like.

SUMMARY OF THE INVENTION

The present invention provides a copolymerized polycarbonate resin that can have excellent properties in terms of chemical resistance, thermal resistance and/or external appearance, a method for preparing the same, and an article including the same.

The copolymerized polycarbonate resin includes a repeat unit represented by Formula 1; a repeat unit represented by Formula 2; and a repeat unit represented by Formula 3, wherein the repeat unit represented by Formula 1 is different from the repeat unit represented by Formula 3,

[Formula 1]

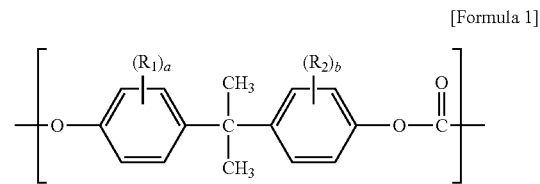

wherein $R_1$ and $R_2$ are the same or different and are each independently substituted or unsubstituted $C_1$ to $C_6$ alkyl, and a and b are the same or different and are each independently an integer from 1 to 4,

[Formula 2]

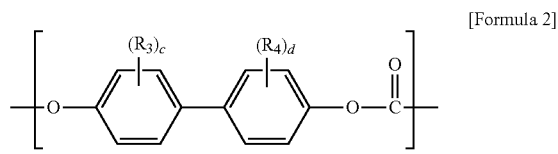

wherein $R_3$ and $R_4$ are the same or different and are each independently substituted or unsubstituted $C_1$ to $C_6$ alkyl, and c and d are the same or different and are each independently an integer from 1 to 4,

[Formula 3]

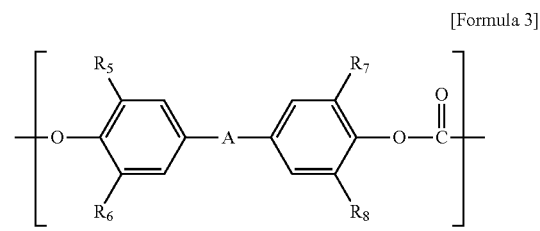

wherein A is a substituted or unsubstituted $C_1$ to $C_{30}$ hydrocarbon group, a $C_1$ to $C_{30}$ hydrocarbon group including O or S, a halogen acid ester, a carbonate ester, CO, S, or $SO_2$, and $R_5$, $R_6$, $R_7$ and $R_8$ are the same or different and are each independently substituted or unsubstituted $C_1$ to $C_6$ alkyl.

In one embodiment, the copolymerized polycarbonate resin may include the repeat unit represented by Formula 1 in an amount of about 40 mol % to about 99.8 mol %, the repeat unit represented by Formula 2 in an amount of about 0.1 mol % to about 50 mol %, and the repeat unit represented by Formula 3 in an amount of about 0.1 mol % to about 50 mol %.

In one embodiment, the copolymerized polycarbonate resin may have a weight average molecular weight of about 15,000 g/mol to about 50,000 g/mol.

In one embodiment, the copolymerized polycarbonate resin may have a Vicat softening temperature (VST) of about 150° C. or more, as measured in accordance with ASTM D1525.

In one embodiment, the copolymerized polycarbonate resin may have a visible light transmittance of about 75% or more, as measured on a 2.5 mm thick flat specimen after dipping the specimen in a diluent for undercoating of a polycarbonate resin for 2 minutes and drying the same at 80° C. for 30 minutes.

The present invention also relates to a method for preparing a copolymerized polycarbonate resin. The method include polymerizing a carbonate precursor with a diol mixture including a diol represented by Formula 4, a diol represented by Formula 5 and a diol represented by Formula 6, wherein the diol represented by Formula 4 is different from the diol represented by Formula 6,

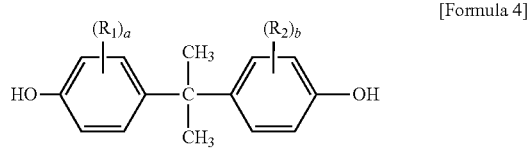

[Formula 4]

wherein $R_1$ and $R_2$ are the same or different and are each independently substituted or unsubstituted $C_1$ to $C_6$ alkyl, and a and b are the same or different and are each independently an integer from 1 to 4,

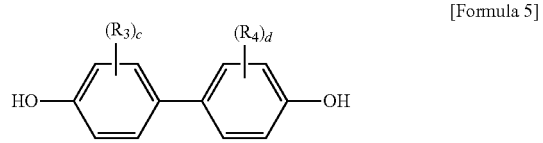

[Formula 5]

wherein $R_3$ and $R_4$ are the same or different and are each independently substituted or unsubstituted $C_1$ to $C_6$ alkyl, and c and d are the same or different and are each independently an integer from 1 to 4,

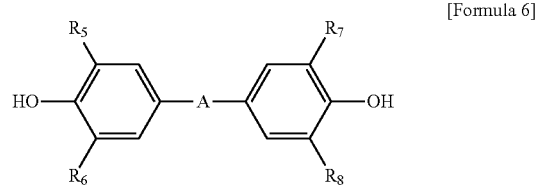

[Formula 6]

wherein A is a substituted or unsubstituted $C_1$ to $C_{30}$ hydrocarbon group, a $C_1$ to $C_{30}$ hydrocarbon group including O or S, a halogen acid ester, a carbonate ester, CO, S, or $SO_2$, and $R_5$, $R_6$, $R_7$ and $R_8$ are the same or different and are each independently substituted or unsubstituted $C_1$ to $C_6$ alkyl.

In one embodiment, the diol mixture may include the diol represented by Formula 4 in an amount of about 40 mol % to about 99.8 mol %, the diol represented by Formula 5 in an amount of about 0.1 mol % to about 50 mol %, and the diol represented by Formula 6 in an amount of about 0.1 mol % to about 50 mol %.

In one embodiment, the carbonate precursor may be diaryl carbonate.

In one embodiment, the polymerization may be performed by melt polymerization.

The present invention also relates to an article formed from the copolymerized polycarbonate resin.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to the invention, a copolymerized polycarbonate resin includes a repeat unit represented by Formula 1, a repeat unit represented by Formula 2, and a repeat unit represented by Formula 3 in a main chain. Here, the repeat unit represented by Formula 1 has a different structure from that of the repeat unit represented by Formula 3.

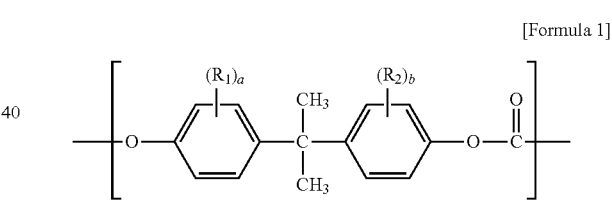

[Formula 1]

wherein $R_1$ and $R_2$ are the same or different and are each independently substituted or unsubstituted $C_1$ to $C_6$ alkyl; and a and b are the same or different and are each independently an integer from 1 to 4.

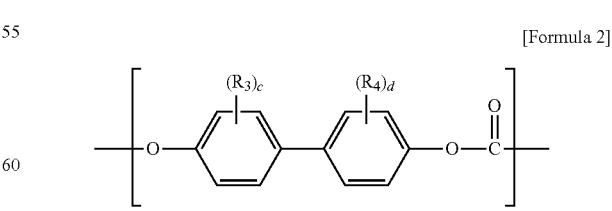

[Formula 2]

wherein $R_3$ and $R_4$ are the same or different and are each independently substituted or unsubstituted $C_1$ to $C_6$ alkyl; and c and d are the same or different and are each independently an integer from 1 to 4.

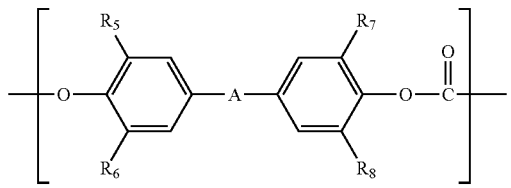

[Formula 3]

wherein A is a substituted or unsubstituted $C_1$ to $C_{30}$ hydrocarbon group, a $C_1$ to $C_{30}$ hydrocarbon group containing O or S, a halogen acid ester, a carbonic acid ester, CO, S, or $SO_2$; and $R_5$, $R_6$, $R_7$ and $R_8$ are the same or different and are each independently substituted or unsubstituted $C_1$ to $C_6$ alkyl.

As used herein, the term "substituted" means that a hydrogen atom is substituted with halogen, $C_1$ to $C_{10}$ alkyl, $C_1$ to $C_{10}$ haloalkyl, $C_6$ to $C_{10}$ aryl, $C_1$ to $C_{10}$ alkoxy, or combinations thereof. The term "alkyl" means a linear, branched or cyclic alkyl, unless specified otherwise. In addition, the term "hydrocarbon group" means a saturated or unsaturated linear, branched or cyclic hydrocarbon group. As used herein, a "linear" type alkyl and/or hydrocarbon may have 1 to 30 carbon atoms, a "branched" type alkyl and/or hydrocarbon group may have two or more carbon atoms, and can have up to 30 carbon atoms, and a "cyclic" alkyl and/or hydrocarbon group may have four or more carbon atoms, and can have up to 30 carbon atoms.

The repeat unit represented by Formula 3 is obtained by substituting 3, 3', 5, 5' positions of a benzene ring with alkyl groups to prevent Fries rearrangement at temperatures of about 200° C. or more. In one embodiment, A may be substituted or unsubstituted $C_1$ to $C_{30}$ alkylene, substituted or unsubstituted $C_2$ to $C_5$ alkenylene, substituted or unsubstituted $C_2$ to $C_5$ alkylidene, substituted or unsubstituted $C_5$ to $C_6$ cycloalkylene, substituted or unsubstituted $C_5$ to $C_6$ cycloalkenylene, substituted or unsubstituted $C_5$ to $C_{10}$ cycloalkylidene, substituted or unsubstituted $C_6$ to $C_{30}$ arylene, substituted or unsubstituted $C_1$ to $C_{20}$ alkoxylene, a halogen acid ester, a carbonic acid ester, CO, S, or $SO_2$. $R_5$, $R_6$, $R_7$ and $R_8$ may be each independently methyl, without being limited thereto.

The copolymerized polycarbonate resin according to the invention may include the repeat unit represented by Formula 1 in an amount of about 40 mol % to about 99.8 mol %, for example about 45 mol % to about 96 mol %, and as another example about 50 mol % to about 90 mol %, based on 100 mol % of the copolymerized polycarbonate resin; the repeat unit represented by Formula 2 in an amount of about 0.1 mol % to about 50 mol %, for example about 1 mol % to about 30 mol %, and as another example about 5 mol % to about 20 mol %, based on 100 mol % of the copolymerized polycarbonate resin; and the repeat unit represented by Formula 3 in an amount of about 0.1 mol % to about 50 mol %, for example about 3 mol % to about 40 mol %, and as another example about 5 mol % to about 30 mol %, based on 100 mol % of the copolymerized polycarbonate resin.

In some embodiments, the copolymerized polycarbonate resin may include the repeat unit represented by Formula 1 in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, or 99.8 mol %. Further, according to some embodiments of the present invention, the amount of the repeat unit represented by Formula 1 can be in a range from about any of the foregoing amounts to about any other of the foregoing amounts.

In some embodiments, the copolymerized polycarbonate resin may include the repeat unit represented by Formula 2 in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol %. Further, according to some embodiments of the present invention, the amount of the repeat unit represented by Formula 2 can be in a range from about any of the foregoing amounts to about any other of the foregoing amounts.

In some embodiments, the copolymerized polycarbonate resin may include the repeat unit represented by Formula 3 in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol %. Further, according to some embodiments of the present invention, the amount of the repeat unit represented by Formula 3 can be in a range from about any of the foregoing amounts to about any other of the foregoing amounts.

When the copolymerized polycarbonate resin includes the repeat units represented by Formulas 1, 2, and 3 in amounts within the above ranges, the copolymerized polycarbonate resin may have excellent properties in terms of thermal resistance, chemical resistance, external appearance, and the like.

In one embodiment, a molar ratio of the repeat unit represented by Formula 1 to the repeat unit represented by Formula 3 (Formula 1:Formula 3) may be about 1:about 0.01 to about 1:about 0.7, for example about 1:about 0.02 to about 1:about 0.6. Within this range, the copolymerized polycarbonate resin can have an excellent balance between thermal resistance, external appearance, and the like.

The copolymerized polycarbonate resin according to the invention may have a weight average molecular weight from about 15,000 g/mol to about 50,000 g/mol, for example from about 20,000 g/mol to about 40,000 g/mol, as measured by Gel Permeation Chromatography (GPC). Within this range, the copolymerized polycarbonate resin can exhibit excellent properties in terms of thermal resistance, chemical resistance, external appearance, and the like.

The copolymerized polycarbonate resin may have a Vicat softening temperature (VST) of about 150° C. or more, for example from about 152° C. to about 180° C., as measured in accordance with ASTM D1525.

In addition, the copolymerized polycarbonate resin may have a visible light transmittance (transmittance after dipping in a paint solution, unit: %) of about 75% or more, for example from about 80 to about 98%, as measured on a 2.5 mm thick flat specimen using a hazemeter after dipping the specimen in a thinner for undercoating of a polycarbonate resin for 2 minutes and drying the same at 80° C. for 30 minutes. Within this range, the polycarbonate resin can provide excellent chemical resistance.

The copolymerized polycarbonate resin according to the invention may be prepared by any typical method for preparation of polycarbonate resin. For example, the copolymerized polycarbonate resin may be prepared by polymerization of a carbonate precursor with a diol mixture, which includes a diol represented by Formula 4, a diol represented by Formula 5, and a diol represented by Formula 6.

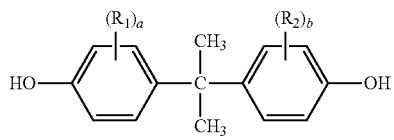

[Formula 4]

wherein $R_1$, $R_2$, a, and b are the same as defined in Formula 1.

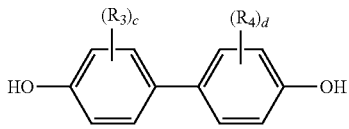

[Formula 5]

wherein $R_3$, $R_4$, c, and d are the same as defined in Formula 2.

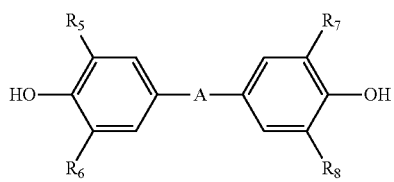

[Formula 6]

wherein A, $R_5$, $R_6$, $R_7$ and $R_8$ are the same as defined in Formula 3.

The diol represented by Formula 4 (aromatic dihydroxy compound) has a different structure than the compound represented by Formula 6. Examples of the diol represented by Formula 4 may include without limitation 2,2-bis-(4-hydroxyphenyl)-propane, 2,2-bis-(3,5-dimethyl-4-hydroxyphenyl)-propane, 2,2-bis-(3,5-diethyl-4-hydroxyphenyl)-propane, 2,2-bis-(3,5-diisopropyl-4-hydroxyphenyl)-propane, and 2,2-bis-(3,5-dibutyl-4-hydroxyphenyl)-propane, and the like, and combinations thereof. In exemplary embodiments, the diol represented by Formula 4 includes 2,2-bis-(4-hydroxyphenyl)-propane (bisphenol A).

In addition, examples of the diol represented by Formula 5 may include without limitation 4,4'-biphenol, 2,2'-dimethyl 4,4'-biphenyldiol, 3,3-dimethyl 4,4-dihydroxy biphenyl, 2,2', 6,6',-tetramethyl-4,4'-biphenol, and the like, and combinations thereof. Examples of the diol represented by Formula 6 may include without limitation 3,3',5,5'-tetramethylbisphenol A (3,3',5,5'-tetramethylbisphenol A: TMBPA).

In one embodiment, the diol mixture can include: the diol represented by Formula 4 in an amount of about 40 mol % to about 99.8 mol %, for example about 45 mol % to about 96 mol %, and as another example about 50 mol % to about 90 mol %, based on 100 mol % of the diol mixture; the diol represented by Formula 5 in an amount of about 0.1 mol % to about 50 mol %, for example about 1 mol % to about 30 mol %, and as another example about 5 mol % to about 20 mol %, based on 100 mol % of the diol mixture; and the diol represented by Formula 6 in an amount of about 0.1 mol % to about 50 mol %, for example about 3 mol % to about 40 mol %, and as another example about 5 mol to about 30 mol %, based on 100 mol % of the diol mixture.

When the diol mixture includes the diols of Formulas 4, 5, and 6 in amounts within the above ranges, the copolymerized polycarbonate resin can provide excellent properties in terms of thermal resistance, chemical resistance, external appearance, and the like.

In some embodiments, the diol mixture may include the diol represented by Formula 4 in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, or 99.8 mol %. Further, according to some embodiments of the present invention, the amount of the diol represented by Formula 4 can be in a range from about any of the foregoing amounts to about any other of the foregoing amounts.

In some embodiments, the diol mixture may include the diol represented by Formula 5 in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol %. Further, according to some embodiments of the present invention, the amount of the diol represented by Formula 5 can be in a range from about any of the foregoing amounts to about any other of the foregoing amounts.

In some embodiments, the diol mixture may include the diol represented by Formula 6 in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol %. Further, according to some embodiments of the present invention, the amount of the diol represented by Formula 6 can be in a range from about any of the foregoing amounts to about any other of the foregoing amounts.

In one embodiment, the diol represented by Formula 4 and the diol represented by Formula 6 are present in a molar ratio (Formula 4:Formula 6) of about 1:about 0.01 to about 1:about 0.7, for example about 1:about 0.02 to about 1:about 0.6. Within this range of the molar ratio, the copolymerized polycarbonate resin can provide an excellent balance between thermal resistance, external appearance, and the like.

In this invention, the carbonate precursor may be any typical carbonate precursor used for preparation of polycarbonates. Examples of the carbonate precursor may include without limitation phosgene, triphosgene, diaryl carbonate, and the like, and mixtures thereof. In exemplary embodiments, the carbonate precursor includes diaryl carbonate. Examples of the diaryl carbonate may include without limitation diphenyl carbonate, ditolyl carbonate, bis(chlorophenyl)carbonate, m-cresyl carbonate, dinaphthylcarbonate, bis(diphenyl)carbonate, diethyl carbonate, dimethyl carbonate, dibutyl carbonate, dicyclohexyl carbonate, and the like, without being limited thereto. These can be used alone or in combination thereof. In exemplary embodiments, the diaryl carbonate includes diphenyl carbonate.

A molar ratio (diol mixture/carbonate precursor) of the diol mixture to the carbonate precursor may range from about 0.7 to about 1.0, for example from about 0.8 to about 0.98. Within this range of the molar ratio, the copolymerized polycarbonate resin can reduce the amount of unreacted monomers and provide excellent mechanical properties.

In one embodiment, polymerization (transesterification) between the diol mixture and the carbonate precursor may be performed by melt polymerization, interface polymerization, solution polymerization, and the like, for example by melt polymerization. Polymerization may be performed at a temperature from about 150° C. to about 330° C., for example from about 170° C. to about 310° C., and as another example from about 200° C. to about 290° C., under reduced pressure. Within this temperature range, the polymerization can be advantageously performed in view of reaction rate and decrease in side reaction.

In addition, polymerization may be performed under a reduced pressure of about 100 torr or less, for example, about 75 torr or less, and as another example about 30 torr or less, and as another example about 1 torr or less for about 10 minutes or more, for example about 15 minutes to about 24 hours, and as another example about 15 minutes to about 12 hours, which can be advantageous in view of reaction rate and decrease in side reaction.

Polymerization may be performed in the presence of a catalyst. As the catalyst, any typical catalyst used in transesterification may be used. Examples of the catalyst may include without limitation alkali metal catalysts, alkaline earth metal catalysts, and the like, and combinations thereof Examples of the alkali metal catalysts may include without limitation LiOH, NaOH, KOH, and the like. These may be used alone or in combination thereof.

The catalyst may be present in an amount of about $1 \times 10^{-8}$ moles to about $1 \times 10^{-3}$ moles, for example about $1 \times 10^{-7}$ moles to about $1 \times 10^{-4}$ moles, per mole of the diol mixture. Within this range, the copolymerized polycarbonate resin can exhibit sufficient reactivity while minimizing production of side products due to side reaction, thereby obtaining effects of improving thermal stability and color stability.

According to the invention, the copolymerized polycarbonate resin may further include a sulfuric acid ester compound represented by Formula 7, as needed. That is, the sulfuric acid ester compound represented by Formula 7 may be added to the polymer prepared by the aforementioned method to inactivate the catalyst.

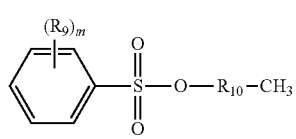

[Formula 7]

wherein each $R_9$ is independently substituted or unsubstituted $C_1$ to $C_{20}$ alkyl, $R_{10}$ is substituted or unsubstituted $C_{11}$ to $C_{20}$ alkylene, and m is an integer from 0 to 5.

Examples of the sulfuric acid ester compound represented by Formula 7 may include without limitation dodecyl p-toluene sulfuric acid ester, octadecyl p-toluene sulfuric acid ester, dodecyl (dodecyl benzene) sulfuric acid ester, octadecyl (dodecyl benzene) sulfuric acid ester, and the like, and combinations thereof.

The sulfuric acid ester compound may be present in an amount of about 0.0001 parts by weight to about 0.001 parts by weight, for example about 0.0003 parts by weight to about 0.0008 parts by weight, based on about 100 parts by weight of the copolymerized polycarbonate resin. Within this range, the copolymerized polycarbonate resin can exhibit excellent thermal stability and/or hydrolysis resistance.

In one embodiment, the sulfuric acid ester compound may be added to the copolymerized polycarbonate resin through in-situ reaction by introducing the sulfuric acid ester compound into a reactor containing the copolymerized polycarbonate resin. In another embodiment, the copolymerized polycarbonate resin may be mixed with the sulfuric acid ester compound in an extrusion process. After the copolymerized polycarbonate resin is transferred to an extruder, the sulfuric acid ester compound can be introduced into the extruder, and extruded together with the polycarbonate resin to form pellets.

Whether the sulfuric acid ester compound is added or not, the polycarbonate resin according to the invention may further include one or more typical additives, as needed. Examples of additives may include without limitation flame retardants such as tris(2,4-di-tert-butylphenyl)phosphate and the like, anti-oxidants such as octadecyl 3-(3,5-di-tert-butyl-4-hydroxyphenyl)propionate and the like, antibacterial agents, release agents, heat stabilizers, photostabilizers, compatibilizers, dyes, inorganic additives, fillers, plasticizers, impact modifiers, chemical agents, lubricants, antistatic agents, pigments, weather-resistant agents, UV protectants, and the like, without being limited thereto. These may be used alone or in combination thereof.

The copolymerized polycarbonate resin according to the invention can exhibit excellent properties in terms of chemical resistance, thermal resistance, etc., may prevent or reduce formation of fine gels due to Fries rearrangement at temperatures of 200° C. or more to allow melt polymerization, and may be used to produce articles such as injection-molded products or films, which have a good external appearance free from silver streaks and the like. For example, the copolymerized polycarbonate resin may be applied to optical materials including optical films, electric and electronic products, exterior materials, automobile components, miscellaneous goods, and the like. Such articles may be produced by typical methods, for example, extrusion molding, injection molding, vacuum molding, cast molding, blow molding, calender molding, and the like. These molding methods are well known to those skilled in the art.

Next, the present invention will be explained in more detail with reference to the following examples. It should be understood that these examples are provided for illustration only and are not to be in any way construed as limiting the present invention.

EXAMPLES

Examples 1 to 5 and Comparative Examples 1 to 5

According to the composition of Table 1, relative to 100 parts by mole of a diol mixture comprising 2,2-bis(4-hydroxyphenyl)propane (BPA), 4,4'-biphenol (BP), and 3,3',5,5'-tetramethylbisphenol A (TMBPA), 104 to 105 parts by mole of diphenyl carbonate (DPC), and 150 ppb KOH (with respect to the total amount of the diol mixture) are sequentially added to a reactor, followed by removing oxygen from the reactor using nitrogen. The temperature of the reactor is elevated to 160° C. and then to 190° C. for reaction for 6 hours. Next, temperature of the reactor is elevated again to 210° C. and maintained at a pressure of 100 torr for 1 hour. Next, the temperature of the reactor is elevated to 260° C. and maintained at a pressure of 20 torr for 1 hour. Then, the pressure of the reactor is reduced to and maintained at 0.5 torr for 1 hour, thereby preparing a molten copolymerized polycarbonate resin. Next, the molten copolymerized polycarbonate resin is passed through dies to prepare a copolymerized polycarbonate resin in pellet form.

TABLE 1

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| BPA (mol %) | 90 | 85 | 80 | 70 | 50 | 100 | 85 | 70 | 90 | 70 |
| BP (mol %) | 5 | 5 | 10 | 10 | 20 | — | 15 | 30 | — | — |
| TMBPA (mol %) | 5 | 10 | 10 | 20 | 30 | — | — | — | 10 | 30 |

Property Evaluation

Each of the copolymerized polycarbonate resins prepared in Examples 1 to 5 and Comparative Examples 1 to 5 are subjected to extrusion at 270° C. using a twin-screw extruder (L/D=29, Diameter=32 mm). Next, pellet specimens are prepared from the extruded product using a pelletizer. The obtained pellet specimens are evaluated as to the following properties, and results are shown in Table 3.

(1) Vicat Softening Temperature (VST, unit: ° C.): Vicat softening temperature is measured under conditions of 50° C./hr at a load of 5 kg using an S6-E (Toyoseiki) in accordance with ASTM D1525.

(2) Silver streak evaluation: The pellets are subjected to injection molding at 290° C. to prepare 5 specimens each having a size of 10 cm×10 cm×3 mm, followed by measurement of silver streaks on the surfaces of the specimens. Then, the silver streaks are graded according to size with reference to Table 2, and an average value of the silver streak grades of each of the specimens are obtained for silver streak evaluation. Here, the silver streak evaluation indicates the quality of an external appearance of an injection-molded product or film. A higher silver streak grade indicates lower external appearance quality.

TABLE 2

| Silver streak size (cm) | 0 | 0.5~1.0 | 1.1~1.5 | 1.6~2.0 | 2.1~3.0 | 3.1 or more |
|---|---|---|---|---|---|---|
| Grade | 0 | 1 | 2 | 3 | 4 | 5 |

(3) Chemical resistance (alcohols): A tensile specimen in accordance with ASTM D638 is prepared by injection molding. Then, in accordance with ASTM D543, Standard for evaluation of Environmental Stress Crack Resistance, with 2.1% strain applied to each specimen, methanol and isopropyl alcohol are dropped onto each specimen, followed by observation of cracking on a curved surface after 10 minutes (⊚: No crack, ○: fine cracks, Δ: lots of cracks, ×: haze due to cracks).

(4) Chemical resistance (transmittance after dipping in paint solution, unit: %): Visible light transmittance (%) is measured on a 2.5 mm thick flat specimen using a hazemeter GmbH 4725 (BYK-Gardner) after dipping the specimen in a thinner (main components: methylisobutylketone, cyclohexanone, 2-ethoxy ethanol) for undercoating of a polycarbonate resin for 2 minutes and drying the same at 80° C. for 30 minutes.

TABLE 3

| | Examples | | | | | Comparative Examples | | | | |
|---|---|---|---|---|---|---|---|---|---|---|
| | 1 | 2 | 3 | 4 | 5 | 1 | 2 | 3 | 4 | 5 |
| VST (° C.) | 154 | 157 | 159 | 165 | 171 | 148 | 150 | 152 | 155 | 167 |
| Silver streak evaluation | 2 | 1 | 1 | 0 | 0 | 40 | 38 | 45 | 1 | 0 |

TABLE 3-continued

| | | Examples | | | | | Comparative Examples | | | | |
|---|---|---|---|---|---|---|---|---|---|---|---|
| | | 1 | 2 | 3 | 4 | 5 | 1 | 2 | 3 | 4 | 5 |
| Chemical resistance | Alcohols | ○ | ⊚ | ⊚ | ⊚ | ⊚ | X | ⊚ | ⊚ | Δ | Δ |
| | Transmittance after dipping in paint solution (%) | 80 | 88 | 88 | 88 | 88 | ~30 | 88 | 88 | 70 | 70 |

From results shown in Table 3, it can be seen that the copolymerized polycarbonate resin according to the present invention (Examples 1 to 5) have good properties in terms of thermal resistance, chemical resistance, external appearance (silver streak evaluation), and good balance therebetween. On the other hand, the specimen of Comparative Example 1 (general polycarbonate resin) suffers from significant deterioration in external appearance and chemical resistance, and the specimens of Comparative Examples 2 and 3 prepared without using TMBPA create a number of silver streaks due to formation of fine gels and thus suffer from significant deterioration in external appearance. In addition, the specimens of Comparative Examples 4 and 5 prepared without using BP suffer from deterioration in chemical resistance.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims.

Although specific terms are employed herein, they are used in a generic and descriptive sense only and not for purposes of limitation, the scope of the invention being defined in the claims.

What is claimed is:

1. A copolymerized polycarbonate resin comprising:
   a repeat unit represented by Formula 1 in an amount of about 60 mol % to about 99.8 mol %;
   a repeat unit represented by Formula 2; and
   a repeat unit represented by Formula 3,
   wherein the repeat unit represented by Formula 1 is different than the repeat unit represented by Formula 3,

[Formula 1]

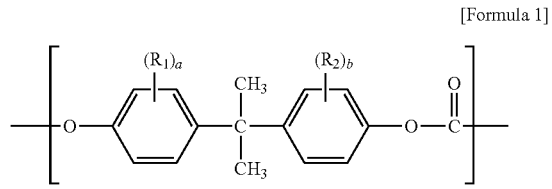

wherein $R_1$ and $R_2$ are the same or different and are each independently substituted or unsubstituted $C_1$ to $C_6$ alkyl; and a and b are the same or different and are each independently an integer from 1 to 4,

[Formula 2]

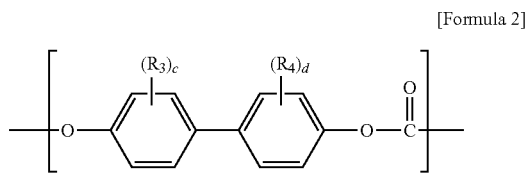

wherein $R_3$ and $R_4$ are the same or different and are each independently substituted or unsubstituted $C_1$ to $C_6$ alkyl; and c and d are the same or different and are each independently an integer from 1 to 4,

[Formula 3]

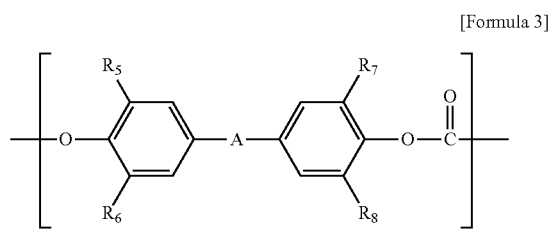

wherein A is a substituted or unsubstituted $C_1$ to $C_{30}$ hydrocarbon group, a $C_1$ to $C_{30}$ hydrocarbon group including O or S, a halogen acid ester, a carbonic acid ester, CO, S, or $SO_2$; and $R_5$, $R_6$, $R_7$ and $R_8$ are the same or different and are each independently substituted or unsubstituted $C_1$ to $C_6$ alkyl.

2. The copolymerized polycarbonate resin according to claim 1, comprising the repeat unit represented by Formula 2 in an amount of about 0.1 mol % to about 50 mol %, and the repeat unit represented by Formula 3 in an amount of about 0.1 mol % to about 50 mol %.

3. The copolymerized polycarbonate resin according to claim 1, wherein the copolymerized polycarbonate resin has a weight average molecular weight of about 15,000 g/mol to about 50,000 g/mol.

4. The copolymerized polycarbonate resin according to claim 1, wherein the copolymerized polycarbonate resin has a Vicat softening temperature (VST) of about 150° C. or more, as measured in accordance with ASTM D1525.

5. The copolymerized polycarbonate resin according to claim 1, wherein the copolymerized polycarbonate resin has a visible light transmittance of about 75% or more, as measured on a 2.5 mm thick flat specimen after dipping the specimen in a thinner for undercoating of a polycarbonate resin for 2 minutes and drying the same at 80° C. for 30 minutes.

6. A method for preparing a copolymerized polycarbonate resin, comprising:
polymerizing a carbonate precursor with a diol mixture of a diol represented by Formula 4 in an amount of about 60 mol % to about 99.8 mol %, a diol represented by Formula 5 and a diol represented by Formula 6,
wherein the diol represented by Formula 4 is different than the diol represented by Formula 6,

[Formula 4]

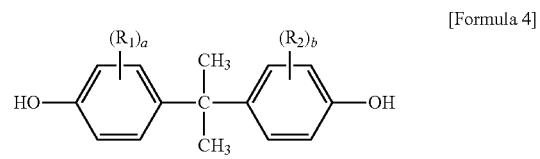

wherein $R_1$ and $R_2$ are the same or different and are each independently substituted or unsubstituted $C_1$ to $C_6$ alkyl; and a and b are the same or different and are each independently an integer from 1 to 4,

[Formula 5]

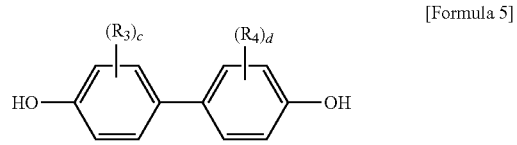

wherein $R_3$ and $R_4$ are the same or different and are each independently substituted or unsubstituted $C_1$ to $C_6$ alkyl; and c and d are the same or different and are each independently an integer from 1 to 4,

[Formula 6]

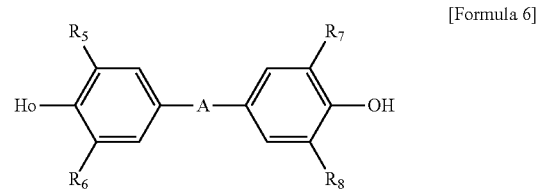

wherein A is a substituted or unsubstituted $C_1$ to $C_{30}$ hydrocarbon group, a $C_1$ to $C_{30}$ hydrocarbon group containing O or S, a halogen acid ester, a carbonic acid ester, CO, S, or $SO_2$; and $R_5$, $R_6$, $R_7$ and $R_8$ are the same or different and are each independently substituted or unsubstituted $C_1$ to $C_6$ alkyl.

7. The method according to claim 6, wherein the diol mixture includes the diol represented by Formula 5 in an amount of about 0.1 mol % to about 50 mol %, and the diol represented by Formula 6 in an amount of about 0.1 mol % to about 50 mol %.

8. The method according to claim 6, wherein the carbonate precursor is diaryl carbonate.

9. The method according to claim 6, wherein polymerization is performed by melt polymerization.

10. A molded article produced from the copolymerized polycarbonate resin according to claim 1.

11. The copolymerized polycarbonate resin according to claim 1, wherein the repeat unit represented by Formula 3 is derived from 3,3',5,5'-tetramethylbisphenol A.

12. The copolymerized polycarbonate resin according to claim 11, wherein the repeat unit represented by Formula 1 is derived from 2,2-bis(4-hydroxyphenyl)propane (bisphenol A) and the repeat unit represented by Formula 2 is derived from 4,4'-biphenol.

13. The method according to claim 6, wherein the diol represented by Formula 6 is 3,3',5,5'-tetramethylbisphenol A.

14. The method according to claim 13, wherein the diol represented by Formula 4 is 2,2-bis(4-hydroxyphenyl)propane (bisphenol A) and the diol represented by Formula 5 is 4,4'-biphenol.

* * * * *

UNITED STATES PATENT AND TRADEMARK OFFICE
CERTIFICATE OF CORRECTION

PATENT NO.         : 9,012,591 B2                                     Page 1 of 1
APPLICATION NO.    : 14/108689
DATED              : April 21, 2015
INVENTOR(S)        : Jun Ho Chi et al.

It is certified that error appears in the above-identified patent and that said Letters Patent is hereby corrected as shown below:

In the Claims
Claim 1, Column 13, Line 33 reads: "or $SO_2$; and ~~$R_5$, $R_6$, $R_7$ and $R_5$~~ are the same or different"
and should read: "or $SO_2$; and $R_5$, $R_6$, R7 and $R_8$ are the same or different"

Claim 6, Column 14, Formula 6 is depicted as:

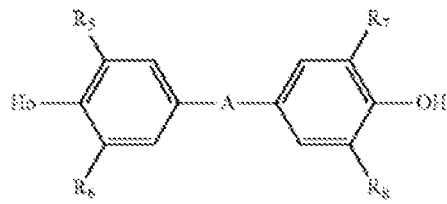

and should be depicted as:

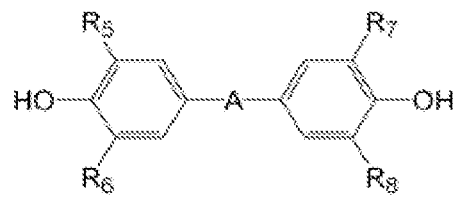

Claim 6, Column 14, Line 39 reads: "or $SO_2$; and ~~$R_5$, $R_6$, $R_7$ and $R_5$~~ are the same or different"
and should read: "or $SO_2$; and $R_5$, $R_6$, R7 and $R_8$ are the same or different"

Signed and Sealed this
Ninth Day of February, 2016

Michelle K. Lee
*Director of the United States Patent and Trademark Office*